(12) United States Patent
McLaughlin et al.

(10) Patent No.: US 10,408,074 B2
(45) Date of Patent: Sep. 10, 2019

(54) CREEP RESISTANT AXIAL RING SEAL

(71) Applicant: United Technologies Corporation, Farmington, CT (US)

(72) Inventors: Brian C. McLaughlin, Kennebunk, ME (US); Thomas E. Clark, Sanford, ME (US); Peter J. Milligan, Kennebunk, ME (US); Dairus Deylan McDowell, Shapleigh, ME (US); Jaimie Schweitzer, Newton, NH (US); Jeremy Drake, South Berwick, ME (US); Richard K. Hayford, Cape Neddick, ME (US)

(73) Assignee: United Technologies Corporation, Farmington, CT (US)

( * ) Notice: Subject to any disclaimer, the term of this patent is extended or adjusted under 35 U.S.C. 154(b) by 292 days.

(21) Appl. No.: 15/137,395

(22) Filed: Apr. 25, 2016

(65) Prior Publication Data

US 2017/0306779 A1    Oct. 26, 2017

(51) Int. Cl.
| | |
|---|---|
| *F01D 11/00* | (2006.01) |
| *F16J 15/02* | (2006.01) |
| *F02C 7/28* | (2006.01) |
| *F02C 7/20* | (2006.01) |
| *F01D 25/24* | (2006.01) |
| *F16J 15/08* | (2006.01) |

(52) U.S. Cl.
CPC .......... *F01D 11/005* (2013.01); *F01D 25/246* (2013.01); *F02C 7/20* (2013.01); *F02C 7/28* (2013.01); *F16J 15/022* (2013.01); *F16J 15/0887* (2013.01); *F05D 2220/32* (2013.01); *F05D 2240/55* (2013.01); *F05D 2250/10* (2013.01); *F05D 2250/70* (2013.01); *F05D 2260/941* (2013.01)

(58) Field of Classification Search
CPC ........ F01D 11/005; F01D 25/246; F02C 7/20; F02C 7/28; F05D 2220/32; F05D 2240/55; F05D 2250/10; F05D 2250/70; F05D 2260/941; F16J 15/022; F16J 15/0887
See application file for complete search history.

(56) References Cited

U.S. PATENT DOCUMENTS

| | | | |
|---|---|---|---|
| 3,359,687 A | 12/1967 | Wallace | |
| 4,314,792 A | 2/1982 | Chaplin | |
| 5,304,031 A | 4/1994 | Bose | |
| 5,365,901 A | 11/1994 | Kiczek | |
| 5,536,022 A | 7/1996 | Sileo | |
| 5,797,723 A * | 8/1998 | Frost | F16J 15/0887 415/174.2 |

(Continued)

OTHER PUBLICATIONS

EP search report for EP17167077.1 dated Oct. 13, 2017.
(Continued)

*Primary Examiner* — Jesse S Bogue
(74) *Attorney, Agent, or Firm* — O'Shea Getz P.C.

(57) ABSTRACT

Aspects of the disclosure are directed to a seal comprising: a first leg that emanates from a center point of the seal and is configured to contact a first component, a second leg that emanates from the center point and is configured to contact a second component that is operative at a temperature that is within a range of 648 degrees Celsius to 1093 degrees Celsius, and a third leg that emanates from the center point.

19 Claims, 7 Drawing Sheets

(56) References Cited

U.S. PATENT DOCUMENTS

| | | | | |
|---|---|---|---|---|
| 6,076,835 | A * | 6/2000 | Ress | F01D 11/005 |
| | | | | 277/637 |
| 6,241,471 | B1 | 6/2001 | Herron | |
| 6,751,962 | B1 * | 6/2004 | Kuwabara | F01D 9/023 |
| | | | | 60/752 |
| 6,854,738 | B2 * | 2/2005 | Matsuda | F01D 9/023 |
| | | | | 277/632 |
| 7,101,147 | B2 * | 9/2006 | Balsdon | F01D 11/005 |
| | | | | 277/642 |
| 7,435,049 | B2 | 10/2008 | Ghasripoor | |
| 7,527,469 | B2 * | 5/2009 | Zborovsky | F01D 9/041 |
| | | | | 277/412 |
| 7,908,866 | B2 * | 3/2011 | Kato | F01D 9/023 |
| | | | | 60/752 |
| 8,157,511 | B2 * | 4/2012 | Pietrobon | F01D 11/005 |
| | | | | 277/641 |
| 8,491,259 | B2 * | 7/2013 | Sutcu | F01D 9/023 |
| | | | | 415/134 |
| 8,651,497 | B2 * | 2/2014 | Tholen | F01D 11/005 |
| | | | | 277/644 |
| 8,695,989 | B2 * | 4/2014 | Dahlke | F23M 5/02 |
| | | | | 277/644 |
| 8,888,445 | B2 * | 11/2014 | Pruthi | F01D 9/023 |
| | | | | 415/174.1 |
| 9,366,444 | B2 * | 6/2016 | Salunkhe | F01D 9/023 |
| 9,587,502 | B2 * | 3/2017 | Davis | F01D 11/005 |
| 9,708,922 | B1 * | 7/2017 | Davis | F01D 11/005 |
| 9,879,555 | B2 * | 1/2018 | Moehrle | F01D 11/005 |
| 9,879,780 | B2 * | 1/2018 | Rogers | F16J 15/104 |
| 9,909,503 | B2 * | 3/2018 | Salamon | F01D 11/001 |
| 2005/0082768 | A1 * | 4/2005 | Iguchi | F01D 11/005 |
| | | | | 277/591 |
| 2007/0138751 | A1 * | 6/2007 | Iguchi | F01D 11/005 |
| | | | | 277/644 |
| 2008/0053107 | A1 * | 3/2008 | Weaver | F01D 9/023 |
| | | | | 60/800 |
| 2008/0124210 | A1 | 5/2008 | Wayte | |
| 2012/0235366 | A1 | 9/2012 | Walunj | |
| 2014/0363622 | A1 * | 12/2014 | Lazur | F02C 7/28 |
| | | | | 428/119 |
| 2015/0377069 | A1 * | 12/2015 | Landwehr | F01D 25/28 |
| | | | | 415/1 |
| 2016/0115809 | A1 * | 4/2016 | Davis | F01D 11/005 |
| | | | | 277/592 |
| 2016/0312640 | A1 | 10/2016 | Clouse et al. | |

OTHER PUBLICATIONS

Robert C. Bill, "Wear of Seal Materials Used in Aircraft Propulsion Systems", Elsevier Sequoia S.A., Printed in the Netherlands, pp. 165-189, 1980.

* cited by examiner

CREEP RESISTANT AXIAL RING SEAL

BACKGROUND

Figure 2A:
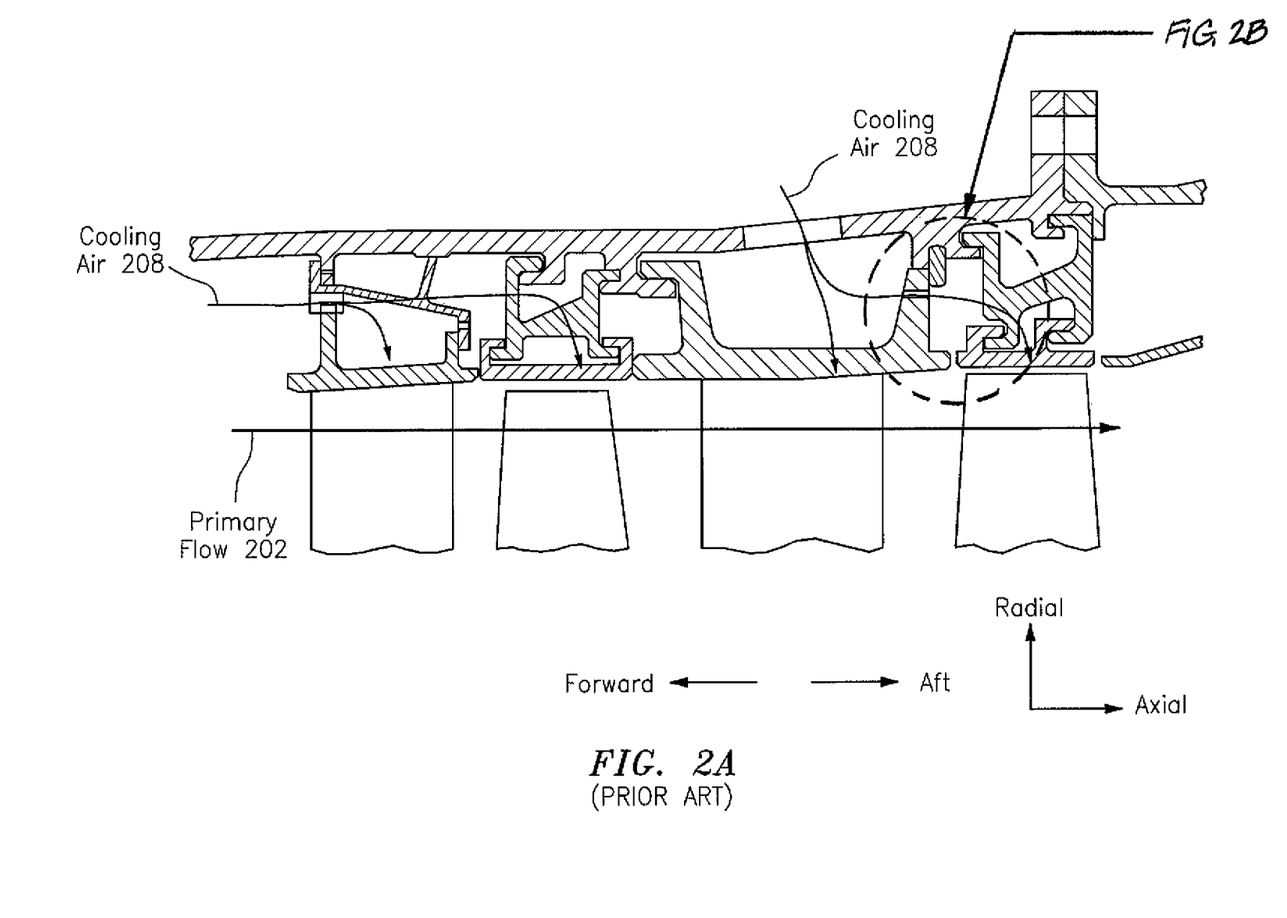
FIG. 2A illustrates a portion of a prior art engine incorporating a primary flow and cooling air.

Gas turbine engines, such as those which power aircraft and industrial equipment, employ a compressor to compress air that is drawn into the engine and a turbine to capture energy associated with the combustion of a fuel-air mixture. Referring to FIG. 2A, the fuel-air mixture may form part of a primary/core flow 202 and may be used to generate thrust. The products of combustion may be at elevated temperatures, which may cause the turbine components to see temperatures as hot as 2000 degrees Fahrenheit (approximately 1093 degrees Celsius).

At least a portion of one or more secondary flows (denoted in FIG. 2A by arrows 208) may provide cooling air to turbine components. The air 208 may be sourced from, e.g., the compressor. Since the amount of air 208 diverted to provide cooling impacts the performance/efficiency of an engine, seals (see FIG. 2B—seal 254) are incorporated as part of a secondary flow system to reduce (e.g., minimize) leakage.

Figure 2B:
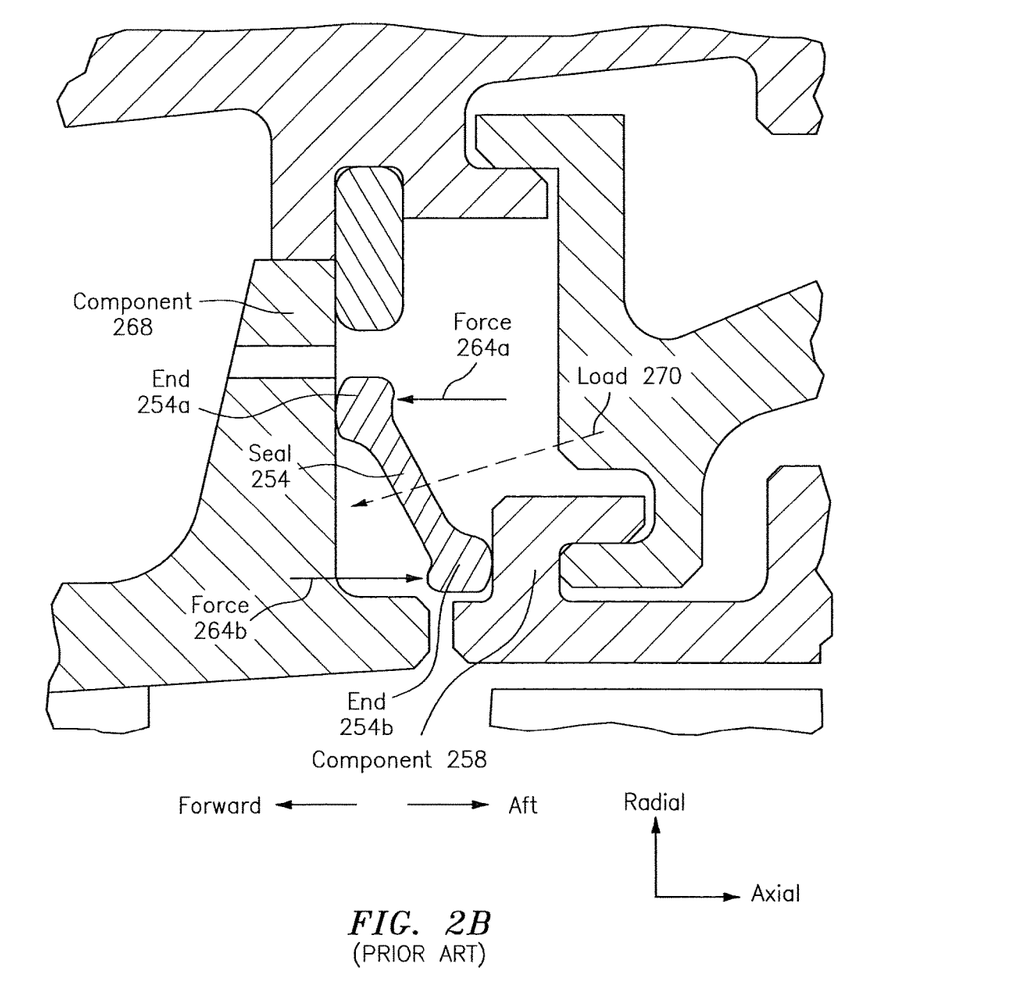
FIG. 2B illustrates a prior art seal.

Referring to FIG. 2B, a conventional two-point axial ring seal 254 is shown. The seal 254 is commonly referred to as a dog-bone seal and operates as a mechanical, non-linear spring. An axial interference fit is provided between the seal 254 and adjacent components (e.g., component 258), which causes the seal to be subject to a rolling motion. For example, the ends 254a and 254b of the seal 254 may be subject to a rolling motion, where the end 254a may be urged aft and the end 254b may be urged forward in FIG. 2B. As the two ends 254a and 254b deflect elastically to new locations (e.g., new diameters), hoop stress is introduced which acts in a restorative manner. For example, elastic restorative forces imposed on the ends 254a and 254b are shown via arrows 264a and 264b, respectively.

Ideally, the seal 254 maintains contact with the adjacent components (e.g., the component 258, component 268) despite axial motion and a pressure differential that urges the seal 254 to lose contact with the components. For example, a pressure load 270 may be imposed on the seal 254, where the load 270 is a result of the secondary flows 208 being at an elevated pressure.

Given that the seal 254 is often in contact with extremely hot components, such as for example at the interface between the end 254b and the component 258, the functional or structural integrity of the seal 254 may be compromised due to creep. Creep occurs when the material of the seal 254 is subjected to elevated stress (e.g., elevated temperature) for extended periods of time. Creep causes the material of the seal 254 to permanently deform (based on the deflected state/position that the seal 254 assumes), even when the magnitude of the stress is below the material's yield strength. Creep degrades the seal 254's ability to withstand the load 270 over time, which can cause the seal 254 (e.g., the end 254b) to lose contact with an adjacent component (e.g., the component 258).

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure are directed to a seal comprising: a first leg that emanates from a center point of the seal and is configured to contact a first component, a second leg that emanates from the center point and is configured to contact a second component that is operative at a temperature that is within a range of 648 degrees Celsius to 1093 degrees Celsius, and a third leg that emanates from the center point. In some embodiments, the first leg has a first length, the second leg has a second length, and the third leg has a third length. In some embodiments, the third length is at least 10% of at least one of the first length or the second length. In some embodiments, the seal further comprises a fourth leg that emanates from the center point. In some embodiments, the fourth leg has a fourth length, and a summation of the third length and the fourth length is at least 10% of at least one of the first length or the second length. In some embodiments, the third leg is separated from each of the first leg and the second leg by approximately 90 degrees. In some embodiments, the fourth leg is separated from each of the first leg and the second leg by approximately 90 degrees. In some embodiments, the third leg is separated from each of the first leg and the second leg by approximately 90 degrees. In some embodiments, the seal includes a nickel alloy.

Aspects of the disclosure are directed to an engine comprising: a compressor section, a combustor section axially downstream of the compressor section, a turbine section axially downstream of the combustor section, the turbine section including a first component and a second component, and a seal incorporated in the turbine section, the seal including: a first leg that emanates from a center point of the seal, the first leg contacting the first component, a second leg that emanates from the center point, the second leg contacting the second component, and a third leg that emanates from the center point. In some embodiments, the second component is configured to operate at a temperature that is within a range of 648 degrees Celsius to 1093 degrees Celsius. In some embodiments, the second component includes a blade outer air seal support. In some embodiments, the first component includes an outer case. In some embodiments, the seal is configured to interface to a pressure load. In some embodiments, the pressure load includes air sourced from the compressor section. In some embodiments, the first leg has a first length, the second leg has a second length, and the third leg has a third length. In some embodiments, the third length is at least 10% of at least one of the first length or the second length, and the third length is less than 200% of each of the first length and the second length. In some embodiments, the engine comprises a fourth leg that emanates from the center point. In some embodiments, the fourth leg has a fourth length, and a summation of the third length and the fourth length is at least 10% of at least one of the first length or the second length, and the summation of the third length and the fourth length is less than 200% of each of the first length and the second length.

BRIEF DESCRIPTION OF THE DRAWINGS

The present disclosure is illustrated by way of example and not limited in the accompanying figures in which like reference numerals indicate similar elements. The drawings are not necessarily drawn to scale unless specifically indicated otherwise.

DETAILED DESCRIPTION

It is noted that various connections are set forth between elements in the following description and in the drawings (the contents of which are included in this disclosure by way of reference). It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities.

In accordance with aspects of the disclosure, apparatuses, systems, and methods are directed to a creep resistant axial ring seal. The seal may include three or more full-ring features that emanate from a center of cross-sectional rotation. Creep may occur at a first of the features (e.g., a contact interface between the seal and another component), whereas the other features may provide rolling resistance and resistance to load (e.g., pressure load).

Figure 1:
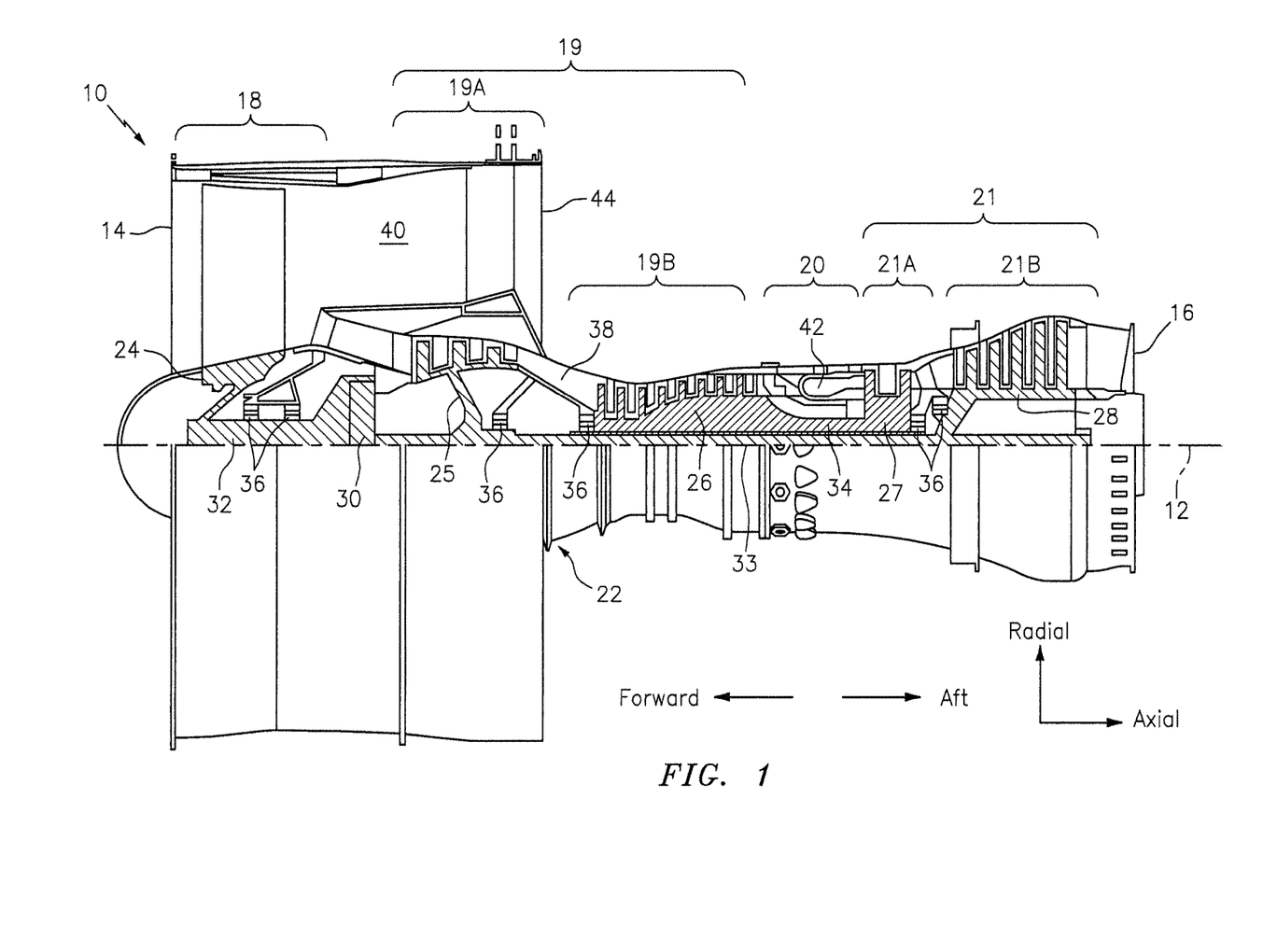
FIG. 1 is a side cutaway illustration of a geared turbine engine.

Aspects of the disclosure may be applied in connection with a gas turbine engine. FIG. 1 is a side cutaway illustration of a geared turbine engine 10. This turbine engine 10 extends along an axial centerline 12 between an upstream airflow inlet 14 and a downstream airflow exhaust 16. The turbine engine 10 includes a fan section 18, a compressor section 19, a combustor section 20 and a turbine section 21. The compressor section 19 includes a low pressure compressor (LPC) section 19A and a high pressure compressor (HPC) section 19B. The turbine section 21 includes a high pressure turbine (HPT) section 21A and a low pressure turbine (LPT) section 21B.

The engine sections 18-21 are arranged sequentially along the centerline 12 within an engine housing 22. Each of the engine sections 18-19B, 21A and 21B includes a respective rotor 24-28. Each of these rotors 24-28 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 24 is connected to a gear train 30, for example, through a fan shaft 32. The gear train 30 and the LPC rotor 25 are connected to and driven by the LPT rotor 28 through a low speed shaft 33. The HPC rotor 26 is connected to and driven by the HPT rotor 27 through a high speed shaft 34. The shafts 32-34 are rotatably supported by a plurality of bearings 36; e.g., rolling element and/or thrust bearings. Each of these bearings 36 is connected to the engine housing 22 by at least one stationary structure such as, for example, an annular support strut.

During operation, air enters the turbine engine 10 through the airflow inlet 14, and is directed through the fan section 18 and into a core gas path 38 and a bypass gas path 40. The air within the core gas path 38 may be referred to as "core air". The air within the bypass gas path 40 may be referred to as "bypass air". The core air is directed through the engine sections 19-21, and exits the turbine engine 10 through the airflow exhaust 16 to provide forward engine thrust. Within the combustor section 20, fuel is injected into a combustion chamber 42 and mixed with compressed core air. This fuel-core air mixture is ignited to power the turbine engine 10. The bypass air is directed through the bypass gas path 40 and out of the turbine engine 10 through a bypass nozzle 44 to provide additional forward engine thrust. This additional forward engine thrust may account for a majority (e.g., more than 70 percent) of total engine thrust. Alternatively, at least some of the bypass air may be directed out of the turbine engine 10 through a thrust reverser to provide reverse engine thrust.

FIG. 1 represents one possible configuration for an engine 10. Aspects of the disclosure may be applied in connection with other environments, including additional configurations for gas turbine engines. Aspects of the disclosure may be applied in connection with non-geared engines.

Figure 3:
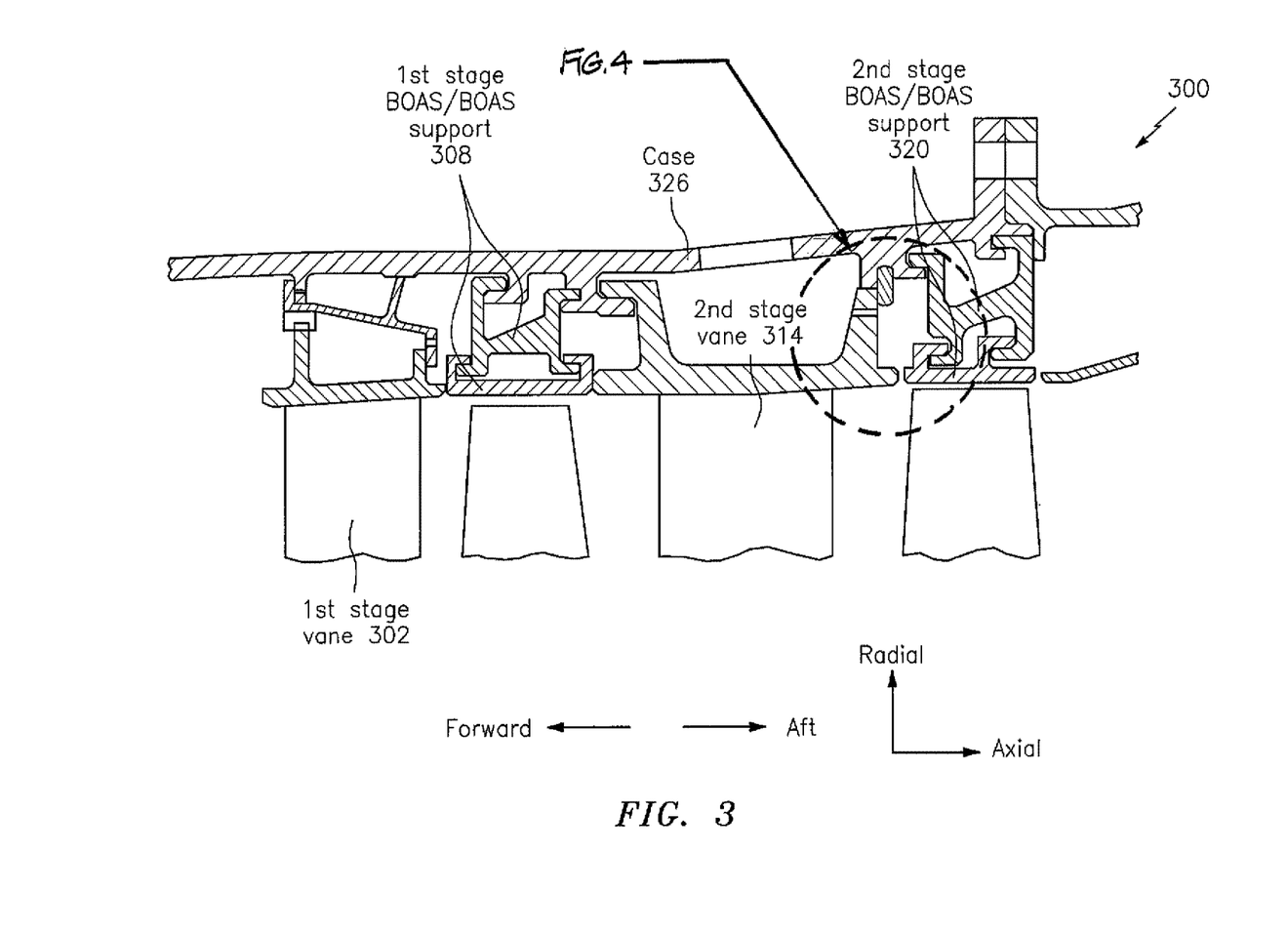
FIG. 3 illustrates a cross-section of a turbine section of an engine.

Referring to FIG. 3, a turbine section 300 of an engine is shown. The turbine section 300 may correspond to the high pressure turbine (HPT) section 21A of the engine 10 of FIG. 1. Proceeding in a forward-to-aft manner in FIG. 3, the turbine section 300 is shown as including a first stage vane 302, a first stage blade outer air seal (BOAS)/BOAS support 308, a second stage vane 314, and a second stage BOAS/BOAS support 320. An outer case 326 may provide structural support for the vanes 302 and 314 and the BOAS/BOAS supports 308 and 320. A seal may be incorporated as part of one or more portions of the turbine section 300. For example, a seal may be incorporated as part of the BOAS/BOAS supports 308 and 320.

Figure 4:
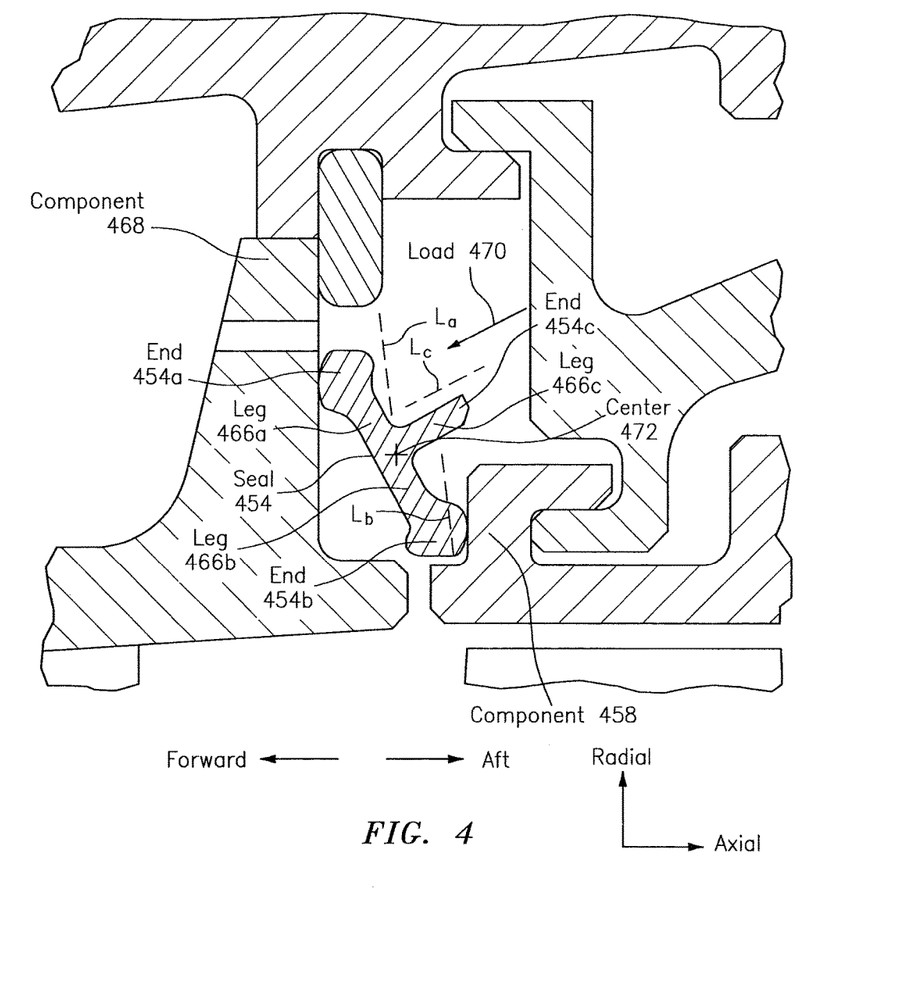
FIGS. 4-5 illustrate seals that may be incorporated as part of an engine in accordance with aspects of this disclosure.
Figure 6A:
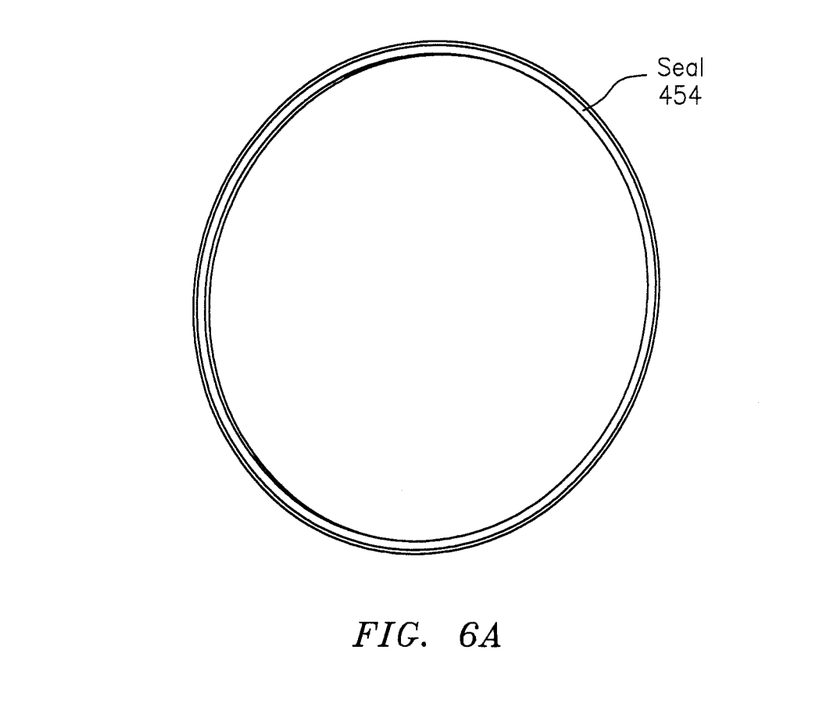
FIG. 6A illustrates a full-hoop arrangement associated with a seal in accordance with aspects of this disclosure.
Figure 6B:
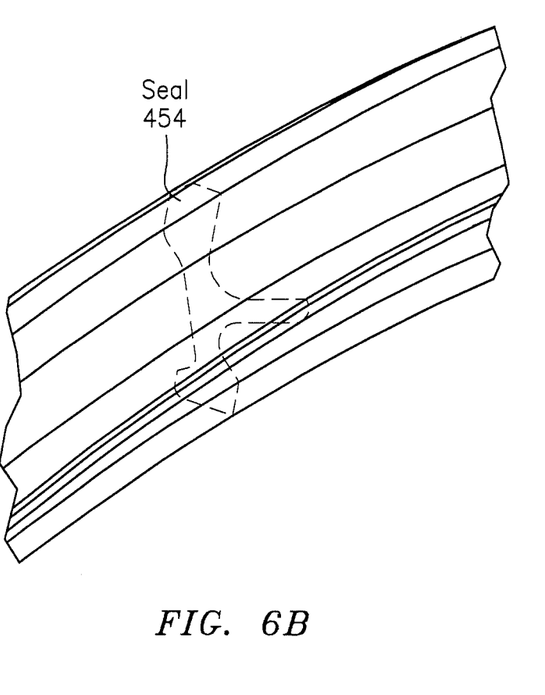
FIG. 6B illustrates a section of the full-hoop arrangement of FIG. 6A with the cross-section of the seal of FIG. 4 visible.

FIG. 4 illustrates an example of a seal 454 that may be included as part of the turbine section 300 of FIG. 3. The seal 454 may be a full-hoop/full-ring structure (see, e.g., FIG. 6A), a cross-section of which is shown in FIGS. 4 and 6B.

The seal 454 may include at least three legs, denoted in FIG. 4 via reference characters 466a, 466b, and 466c. The legs 466a-466c may emanate from a center point 472 of the seal 454. The legs 466a, 466b, and 466c may terminate at ends 454a, 454b, and 454c, respectively.

The end 454a may contact/interface to a component 466 and the end 454b may contact/interface to a component 458. Much like the component 258 of FIG. 2B, the component 458 may operate at elevated temperatures [in some embodiments, temperatures within a range of 1200 degrees Fahrenheit to 2000 degrees Fahrenheit (approximately 648 degrees Celsius to 1093 degrees Celsius)], such that the material of the seal 454 at the end 454b may creep. Conventionally, such creep might compromise the integrity/functionality of a seal in the manner described above because this "hot" portion of the seal is needed for stiffness to resist/counter a load (e.g., a pressure load 470). However, other features of the seal 454 may provide stiffness against the load 470. For example, the leg 466c may be cooler than the leg 466b because the leg 466c might not be in contact with the component 458. As such, the leg 466c provides stiffness to counter the load 470. Moreover, the sealing contacts are maintained at the end 454a with the component 468 and the end 454b with the component 458.

As measured relative to the center point 472 and the ends 454a-454c, the leg 466a may have a length equal to $L_a$, the leg 466b may have a length $L_b$, and the leg 466c may have a length equal to $L_c$, respectively. The lengths $L_a$ and $L_b$ may be approximately equal. The length $L_c$ may be equal to at least one of the lengths $L_a$ and $L_b$. For example, in embodiments where the lengths $L_a$, $L_b$, and $L_c$ are approximately equal to one another the hoop stresses may be equal in the legs 466a, 466b, and 466c (at least to a first order approximation). In some embodiments, the length $L_c$ may be equal to at least a fraction/percentage of at least one of the lengths $L_a$ or $L_b$. For example, the length $L_c$ may be at least 10% of one of the lengths $L_a$ or $L_b$. The length $L_c$ may be less than 200% of at least one of the lengths $L_a$ or $L_b$.

In FIG. 4, the leg 466c is shown as being oriented at approximately 90 degrees relative to each of the legs 466a and 466b. The legs 466a and 466b may emanate from the center point 472 in substantially opposite directions, thereby forming an approximate angle of 180 degrees between the legs 466a and 466b. The arrangement of the legs 466a-466c in terms of the angular separations of the legs 466a-466c is illustrative; other angular values or patterns for the seal 454 may be used.

Figure 5:
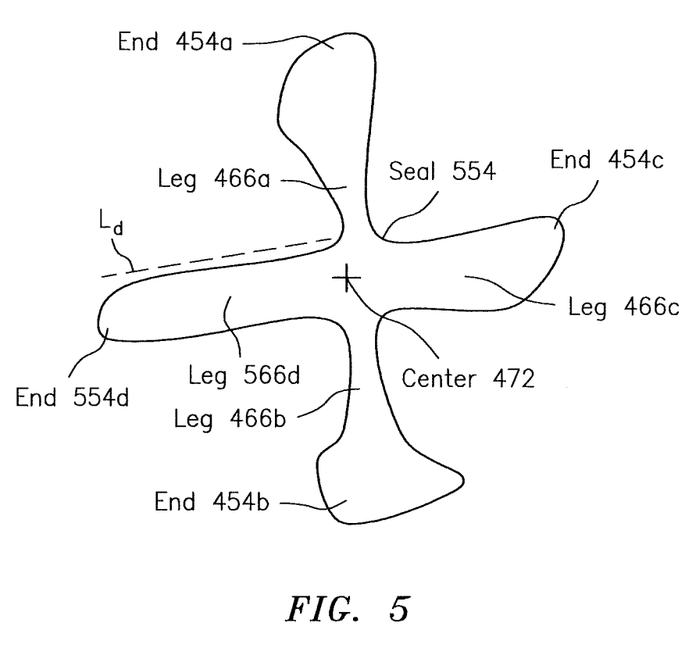

FIG. 5 illustrates a seal 554 that may be used in some embodiments. The seal 554 is shown as including the legs 466a-466c emanating from the center point 472 similar to the seal 454. However, the seal 554 also may include another (e.g., fourth) leg 566d that emanates from the center point 472 and terminates at an end 554d. The leg 566d may have a length $L_d$ as measured between the center point 472 and the end 554d. Referring to FIGS. 4 and 5, a summation of the lengths $L_c$ and $L_d$ may be equal to at least a fraction/percentage of at least one of the lengths $L_a$ or $L_b$. For example, the summation of the lengths $L_c$ and $L_d$ may be at least 10% of at least one of the lengths $L_a$ or $L_b$. The summation of the lengths $L_c$ and $L_d$ may be less than 200% of at least one of the lengths $L_a$ or $L_b$.

In FIG. 5, each of the legs 466a-466c and the leg 566d are shown as being oriented at an angle that is approximately 90 degrees relative to the adjacent legs. The arrangement of the legs 466a-466c and 566d in terms of the angular separations of the legs 466a-466c and 566d is illustrative; other angular values or patterns for the seal 554 may be used.

A seal (e.g., the seal 454 or the seal 554) may be manufactured of one or more materials. For example, the seal may include nickel alloy, Inconel® 718 alloy, etc.

Technical effects and benefits of this disclosure include a seal that has an enhanced lifetime relative to a conventional seal, where the useable lifetime of the seal is based on the seal's ability to withstand a load (e.g., pressure load). Creep may occur at an interface where the seal contacts a component that is operating at elevated temperatures. Other features/points of the seal may provide stiffness to the load while still enabling the seal to maintain contact with one or more adjacent components. Seals in accordance with this disclosure may consume substantially the same footprint as a conventional seal, thereby allowing for the replacement of conventional seals on legacy platforms without a need to redesign the layout of the legacy platforms. Seals in accordance with this disclosure may be incorporated in closer proximity to a primary/core flow path and/or the first stage of a turbine section relative to conventional seals due to the thermal characteristics associated with the seals of this disclosure.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional in accordance with aspects of the disclosure. One or more features described in connection with a first embodiment may be combined with one or more features of one or more additional embodiments.

What is claimed is:

1. An assembly, comprising:
    a first component;
    a second component; and
    a seal body extending circumferentially around an axial centerline, the seal body comprising a first leg, a second leg and a third leg;
    the first leg projecting diagonally, in a first radial direction relative to the axial centerline and a first axial direction relative to the axial centerline, out from a center point on the seal body, and the first leg contacting the first component;
    the second leg projecting diagonally, in a second radial direction relative to the axial centerline and a second axial direction relative to the axial centerline, out from the center point, and the second leg contacting the second component that is operative at a temperature that is within a range of 648 degrees Celsius to 1093 degrees Celsius; and
    the third leg projecting diagonally, in the first radial direction and the second axial direction, out from the center point, wherein the third leg does not contact the second component.

2. The assembly of claim 1, wherein the first leg has a first length, the second leg has a second length, and the third leg has a third length.

3. The assembly of claim 2, wherein the third length is at least 10% of at least one of the first length or the second length.

4. The assembly of claim 1, further comprising:
    a fourth leg projecting diagonally, in the second radial direction and the first axial direction, out from the center point.

5. The assembly of claim 2, further comprising a fourth leg that emanates from the center point, wherein the fourth leg has a fourth length, and wherein a summation of the third length and the fourth length is at least 10% of at least one of the first length or the second length.

6. The assembly of claim 4, wherein the third leg is separated from each of the first leg and the second leg by approximately 90 degrees.

7. The assembly of claim 6, wherein the fourth leg is separated from each of the first leg and the second leg by approximately 90 degrees.

8. The assembly of claim 1, wherein the third leg is separated from each of the first leg and the second leg by approximately 90 degrees.

9. The assembly of claim 1, wherein the seal includes a nickel alloy.

10. An engine with an axial centerline, comprising:
    a compressor section;
    a combustor section axially downstream of the compressor section relative to the axial centerline;
    a turbine section axially downstream of the combustor section relative to the axial centerline, the turbine section including a first component and a second component; and
    a seal incorporated in the turbine section, the seal including:

a first leg that emanates from a center point on the seal, the first leg axially contacting the first component in a first axial direction relative to the axial centerline;

a second leg that emanates from the center point, the second leg axially contacting the second component in a second axial direction relative to the axial centerline that is opposite the first axial direction; and a third leg that emanates from the center point, wherein the third leg does not contact the second component.

11. The engine of claim 10, wherein the second component is configured to operate at a temperature that is within a range of 648 degrees Celsius to 1093 degrees Celsius.

12. The engine of claim 10, wherein the second component includes a blade outer air seal support.

13. The engine of claim 12, wherein the first component includes an outer case.

14. The engine of claim 10, wherein the seal is configured to interface to a pressure load.

15. The engine of claim 14, wherein the pressure load includes air sourced from the compressor section.

16. The engine of claim 10, wherein the first leg has a first length, the second leg has a second length, and the third leg has a third length.

17. The engine of claim 16, wherein the third length is at least 10% of at least one of the first length or the second length, and wherein the third length is less than 200% of each of the first length and the second length.

18. The engine of claim 10, further comprising:
a fourth leg that emanates from the center point.

19. The engine of claim 18, wherein the fourth leg has a fourth length, and wherein a summation of the third length and the fourth length is at least 10% of at least one of the first length or the second length, and wherein the summation of the third length and the fourth length is less than 200% of each of the first length and the second length.

* * * * *